United States Patent [19]
Oh

[11] Patent Number: 5,629,722
[45] Date of Patent: May 13, 1997

[54] SECTION ERASURE CONTROL APPARATUS OF CHARACTER GENERATOR

[75] Inventor: Yong G. Oh, Seoul, Rep. of Korea

[73] Assignee: Goldstar Co., Ltd., Seoul, Rep. of Korea

[21] Appl. No.: 384,227

[22] Filed: Feb. 6, 1995

Related U.S. Application Data

[63] Continuation of Ser. No. 59,653, May 12, 1993, abandoned.

[30] Foreign Application Priority Data

May 15, 1992 [KR] Rep. of Korea ............... 8217/1992

[51] Int. Cl.[6] .............................................. G09G 5/22
[52] U.S. Cl. .............................................. 345/141; 345/26
[58] Field of Search ............................ 369/53, 32, 54; 360/48, 13, 19.1; 358/443, 448, 450, 453, 462, 343, 401; 345/141, 26

[56] References Cited

U.S. PATENT DOCUMENTS

| | | | |
|---|---|---|---|
| 4,309,721 | 1/1982 | Christopher | 369/53 |
| 4,328,557 | 5/1982 | Gastinel | 364/919 |
| 4,881,130 | 11/1989 | Hayashi | 358/443 |
| 5,046,042 | 9/1991 | Nitatori et al. | 360/48 |
| 5,058,096 | 10/1991 | Ando et al. | 369/53 |

FOREIGN PATENT DOCUMENTS 62-107331  5/1987  Japan.

Primary Examiner—Kee M. Tung
Assistant Examiner—Matthew Luu

[57] ABSTRACT

A section erasure control apparatus for a character generator including a section erasure data receiving circuit for receiving section erasure data a section erasure region control circuit for analyzing the section erasure data and identifying a section erasure region and a decoder for decoding output data from the section erasure region control circuit and outputting an erasure execution signal identifying the section erasure region in accordance with the decoding.

13 Claims, 7 Drawing Sheets

FIG.6

| BIT SS | 0 → | DA0 | DA1 | DA2 | DA3 | DA4 | DA5 | DA6 | DA7 | DA8 | DA9 | DAA | DAB | DAC | DAD | DAE | DAF |
|---|---|---|---|---|---|---|---|---|---|---|---|---|---|---|---|---|---|
| 239 | | C0 | C1 | C2 | C3 | C4 | C5 | C6 | BLNK | R | G | B | P | 0 | 0 | 0 | 0 |
| | | Character code | | | | | | | ✕ | Color | | | ✕ | | | | |
| 240 | | C0 | C1 | C2 | C3 | C4 | C5 | C6 | BLNK | R | G | B | P | 0 | 0 | 0 | 0 |
| 241 | | HP0 | HP1 | HP2 | HP3 | HP4 | HP5 | HSZ10 | HSZ11 | HSZ20 | HSZ21 | INT/NCN | ✕ | 0 | 0 | 0 | 0 |
| 242 | | VP0 | VP1 | VP2 | VP3 | VP4 | VP5 | VSZ10 | VSZ11 | VSZ20 | VSZ21 | BLINK 2 | ✕ | 0 | 0 | 0 | 0 |
| 243 | | PHASE 0 | PHASE 1 | PHASE 2 | LEVEL 0 | LEVEL 1 | TC | TEST CK | RAM ERS | DSP 1 | DSP 2 | DSP 3 | ✕ | 0 | 0 | 0 | 0 |
| 244 | | BCCL | YM | EX | BLINK 0 | BLINK 1 | BLK0 | BLK1 | DSP CN | BR | BG | BB | ✕ | 0 | 0 | | |
| | | SECTION ERASURE START ADDRESS | | | | | | | | | | | | | | | |
| 245 | | | | | | | | | | 0 | 0 | 0 | ON/OFF | | | | |
| | | SECTION ERASURE END ADDRESS | | | | | | | | | | | | | | | |

SECTION ERASURE CONTROL APPARATUS OF CHARACTER GENERATOR

This application is a continuation of application Ser. No. 08/059,653 filed on May 12, 1993, now abandoned.

BACKGROUND OF THE INVENTION

The present invention relates to a character generator of video apparatus, such as a video cassette recorder or a television receiver, and more particularly to a section erasure control apparatus of a character generator capable of erasing a character which is displayed at a region except for a predetermined character display region of screen.

Conventionally, a video apparatus, such as a video cassette recorder and a television receiver is equipped with a character generator which can display a character with an on screen display (OSD) function.

According to the conventional character generator, however, there are often generated cases in which a character is erroneously displayed on screen or a character is displayed in a region other than a predetermined character display region on screen.

FIG. 1 illustrates a conventional character display apparatus for a video apparatus, such as a video cassette recorder or a television receiver, and displays an established character on screen.

The character display apparatus comprises a microcomputer 1 for controlling the display of the character; a key signal generator 2 for inputting a command signal for displaying the character from a key board or a remote controller to the microcomputer 1; and a character generator 3 for generating character signal and mixing the character signal with a video signal therein, in accordance with a control signal from the microcomputer 1.

The operation of the character display apparatus will hereinafter be described.

First, if an user gives a command signal for displaying a character to the microcomputer 1 utilizing the keyboard or the remote controller, the microcomputer 1 controls the character generator 3 in accordance with the command signal input from the key signal generator 2.

At this time, the character generator 3 generates a character signal and mixes the character signal with a video signal. The mixed signal is displayed on screen.

FIG. 2, illustrates a a conventional character generator which is equipped in the character display apparatus shown in FIG. 1. The character generator comprises a character size oscillator 11 for generating a clock signal as to the size of a character to be displayed on screen; a character display timing generator 12 for controlling the timing as to the display of the character, in accordance with the output signal from the character size generator 11; an input control part 13 for inputting a clock signal sck and a data signal SIN and separating the data signal from an address signal, in accordance with an external control signal CS; a data control part 14 for receiving the data signal separated from the input control part 13; an address control part 15 for controlling the store of the data signal outputted from the data control part 14, in accordance with the address signal separated from the input control part 13; a display data memory 16 for storing and outputting the character display data corresponding to addresses 0–239 output from the data control part 14, in accordance with an output signal from the address control part 15; a display control register 17 for storing and outputting the display control data corresponding to addresses 240–243 output from the data control part 14, in accordance with the output signal from the address control part 15; a display character read only memory (ROM) 18 for previously storing the fonts of a character to be displayed on screen and controlling the pattern of the character to be displayed output from the display data memory 16; a horizontal position counter 19 for counting the horizontal position of screen; a display position detecting part 20 for generating addresses of the character to be displayed, in accordance with an output signal from the character display timing generator 12 and the horizontal position counter 19; a read address control part 21 for controlling the character signal to be displayed controlling the display data memory 16, in accordance with the output signal of the display position detecting part 20; a shift register 22 for shifting an output signal from the display character ROM 18; a blanking part 23 for blanking the display of character to be displayed, controlling the shift register 22 in accordance with the display control register 17; a display control part 24 for controlling the display of the character with the output signal from the shift register 22; a video output part 25 for mixing the character signal output from the display control part 24 with a video signal and then outputting the mixed signal; a synchronization oscillator 26 for generating a synchronization signal; a synchronization timing generator 27 for controlling the timing of synchronization, in accordance with the output signal from the synchronization oscillator 26; and a synchronization signal switching part 28 for switching the output signal from the synchronization timing generator 27 and an external synchronization signal. The operation of the character generator will be hereinafter described.

First, the character size oscillator 11 outputs a clock signal as to the dot-size of the character to be displayed on screen. The character display timing generator 12 generates a timing signal for controlling the reading-timing of a character signal which is designated by the display data memory 16.

In case that the control signal cs is inputted with a low level potential, the input control part 13 inputs the clock signal sck and the data signal SIN and then separates them into a data signal and an address signal. The data signal is transferred to the data control part 14 and the address signal is transferred to the address control part 15.

The address control part 15 analyzes the address signal. As the result of analysis, the address control part 15 stores the data signal outputted from the data control part 14 in the display data memory 16 in case that the address is corresponding to addresses 0–239 and stores the data signal outputted from the data control part 14 in the display control register 17 in case that the address is corresponding to addresses 240–243.

On the other hand, the display control register 17 controls the blanking part 23 in accordance with blanking bits which are previously stored. The display data memory 16 outputs fonts corresponding to the character to be displayed on screen, and controls the display character ROM 18 in accordance with the data signal therein. The fonts output from the display character ROM 18 are transferred to the display control part 24 through the shift register 22.

The horizontal position counter 19 counts the horizontal position of display character with the output signal from the character display timing generator 12 and the read address control part 21 controls the output of character fonts from the display character ROM 18 and controls the display data memory 16 in accordance with the output signal from the horizontal position counter 19. The character fonts outputs from the display character ROM 18 are input to the video output part 25 and then mixed with the video signal therein. The video output part 25 outputs the signal in which the character fonts are mixed with the video signal.

The synchronization oscillator 26 oscillates to generate a clock signal and the synchronization timing generator 27 generates a horizontal synchronization signal and a vertical synchronization signal, in accordance with the clock signal. On the other hand, the synchronization signal switching part 28 controls the horizontal synchronization signal and the vertical synchronization signal outputted from the synchronization timing generator 27 and the external synchronization signals. In this character generator, it is very important to prevent a wrong operation due to static electricity, in order to avoid erroneously displaying a character on screen.

In order to check an error in the character signal, a parity bit has generally been used. Since the parity bit can merely reduce the number of occurrences of an error, however, a character may be wrongly displayed on screen when a character signal having an error is determined as not having an error using the parity bit.

The microcomputer 1 of the conventional character display apparatus shown in FIG. 1 transfers a display character 1 and a display character 2 to the character generator 3 (100,101) and then outputs blank data 1–blank data 8 as an erasure counter.

Namely, each time a sub-routine is called, the microcomputer 1 transfers the blank data(102–111) as altered lines. Accordingly, the conventional character display apparatus has a disadvantage, in that too much load is placed on the microcomputer 1.

SUMMARY OF THE INVENTION

Therefore, an object of the present invention is to overcome the disadvantage encountered in the above-mentioned conventional art and to provide a section erasure control apparatus for a character generator, which erases a character signal except for a predetermined character display region utilizing a section erasure start address, a section erasure end address and a section erasure on/off bit, thereby enabling the load of the microcomputer to be reduced.

In order to accomplish the above object, the present invention provides a section erasure control apparatus of character generator, comprising section erasure data receiving means for receiving a section erasure data; section erasure region control means for analyzing the section erasure data and controlling a section erasure region in accordance with the analysis result; and decoding means for decoding output data from the section erasure region control means and outputting an erasure execution signal as to the section erasure region in accordance with the decoding result.

BRIEF DESCRIPTION OF THE DRAWINGS

The above and other objects, features and advantages of the present invention will be more clearly understood from the following detailed description taken in conjunction with the accompanying drawings, in which:

FIG. 6 is a table showing address data used in the character generator of the present invention.

DETAILED DESCRIPTION OF THE PREFERRED EMBODIMENT

The present invention will now be explained in conjunction with an embodiment shown in FIG. 4 to FIG. 7.

Figure 1:
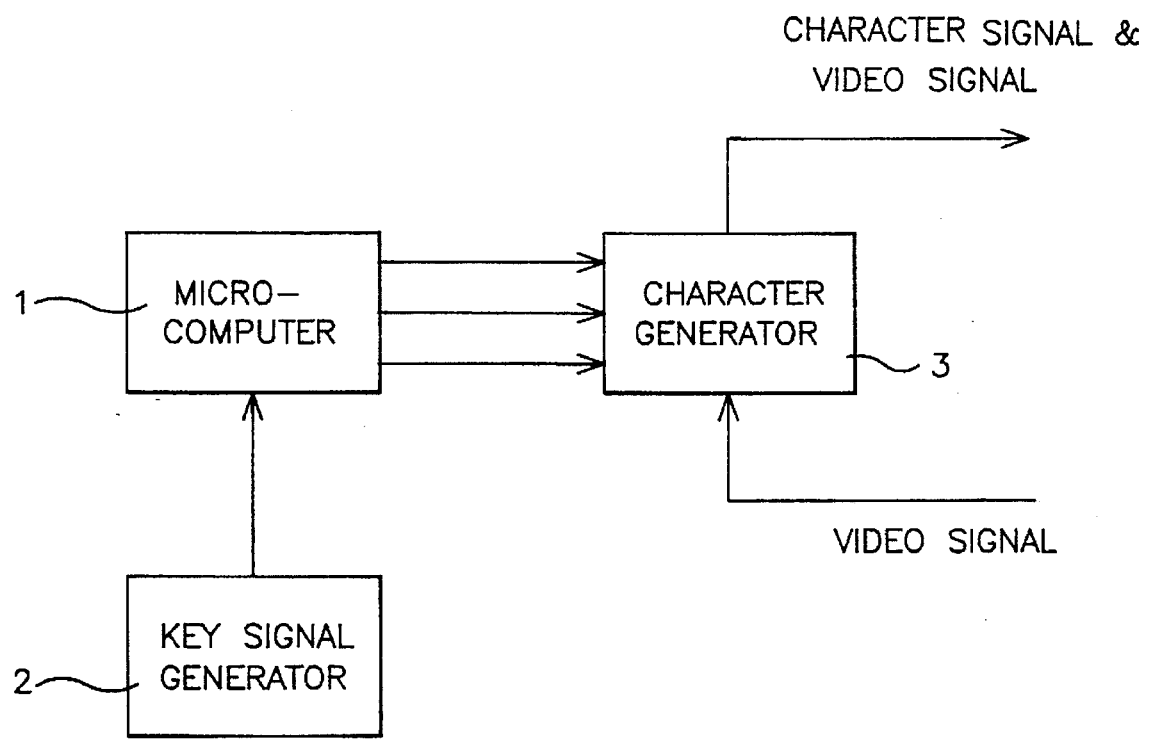
FIG. 1 is a block diagram of a general character display circuit.
Figure 2:
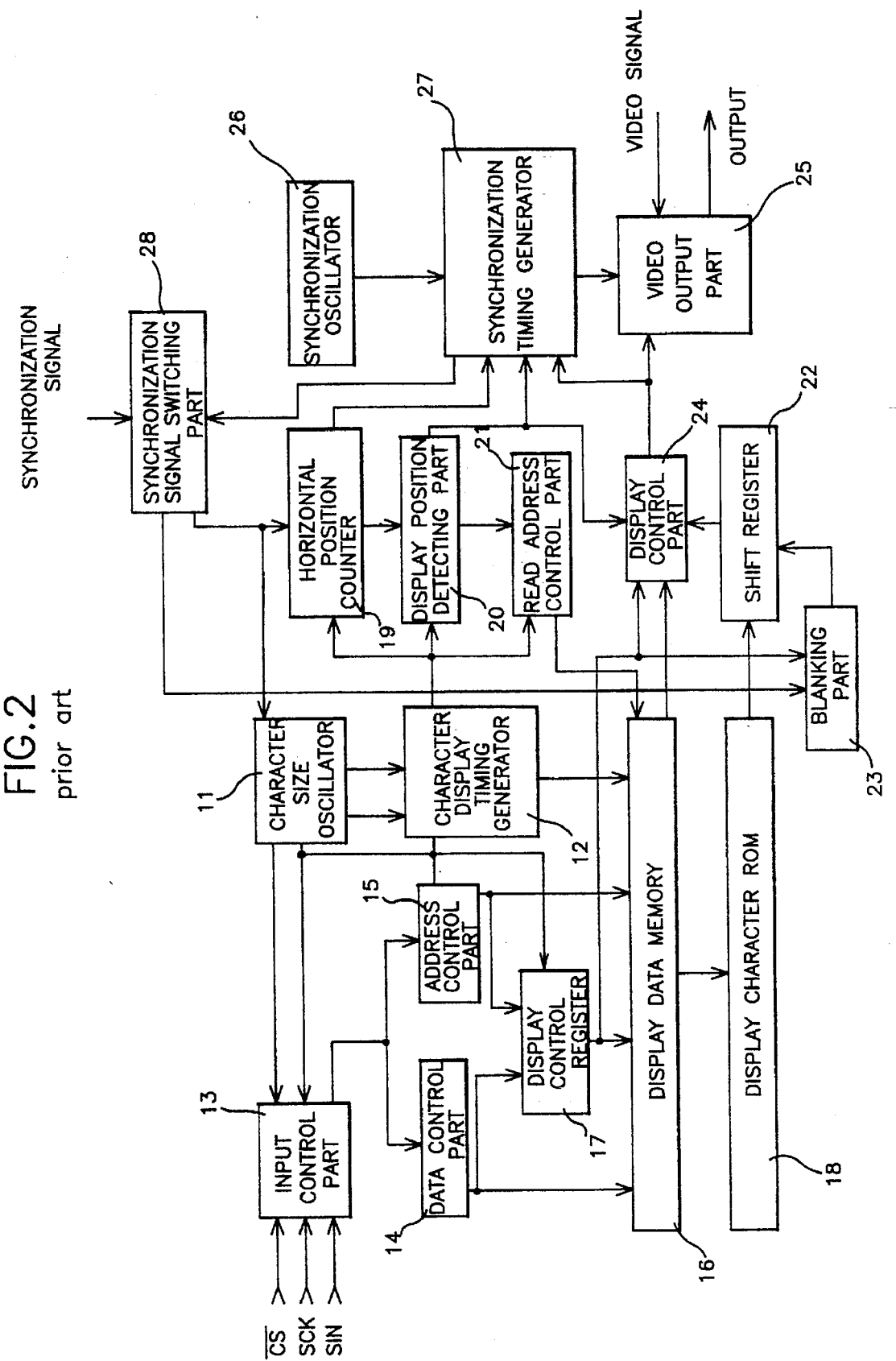
FIG. 2 is a circuital diagram of a conventional character generator.
Figure 3:
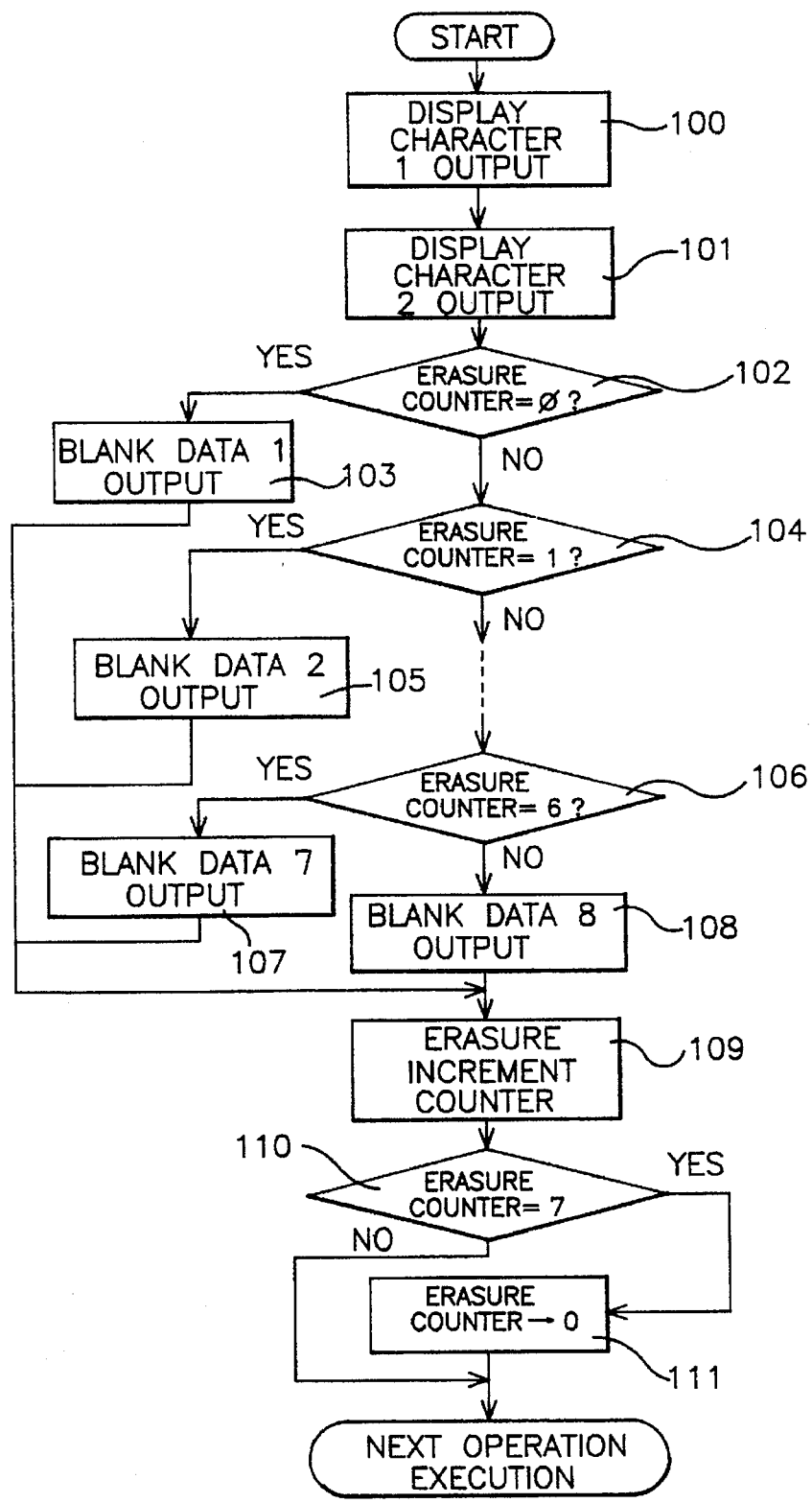
FIG. 3 is a flow chart showing the operation of microcomputer in the conventional character generator.
Figure 4:
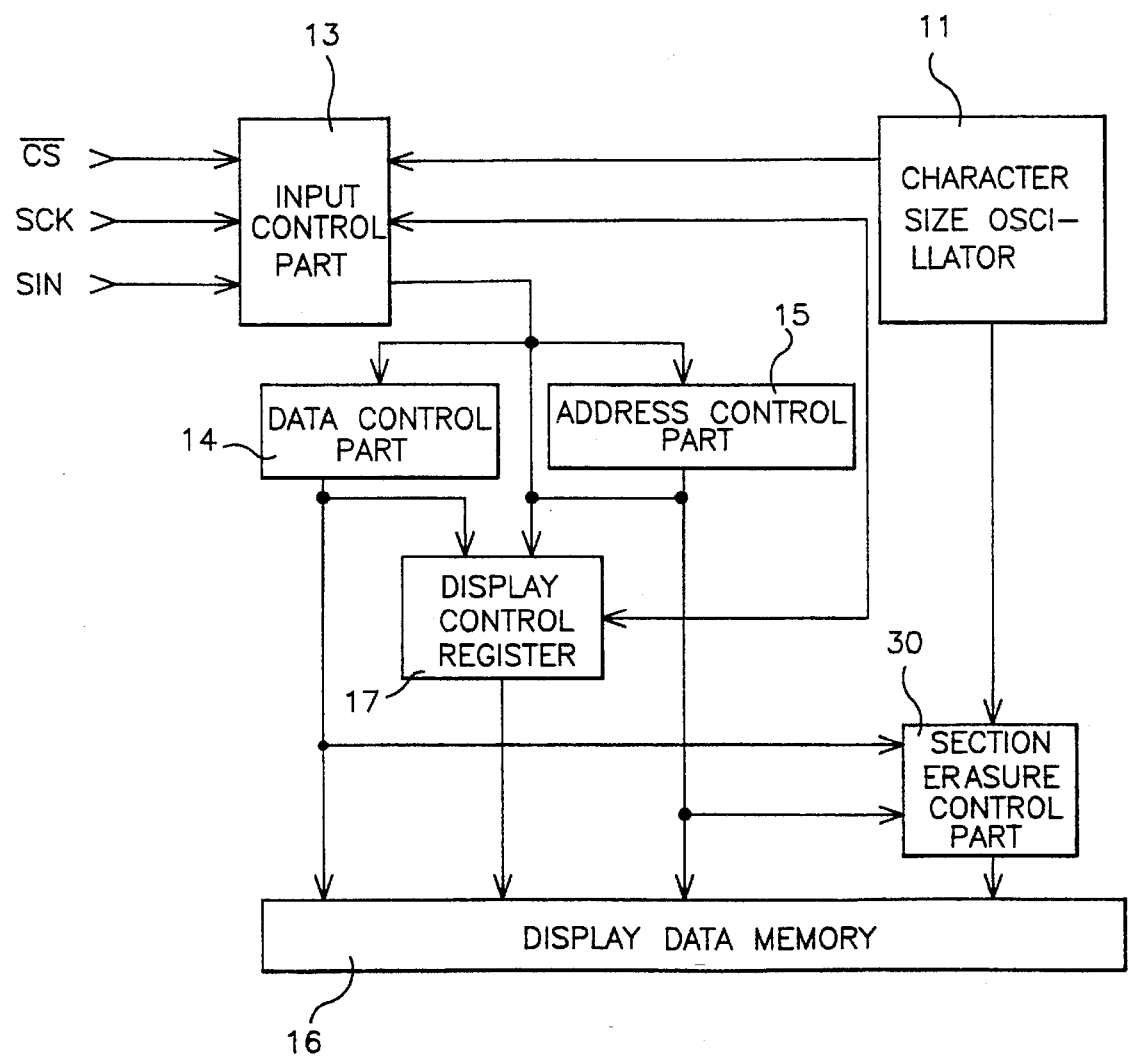
FIG. 4 is a circuit diagram of a character generator including a section erasure control circuit according to the present invention.

FIG. 4, illustrates a block diagram of a character generator including a section erasure control circuit according to the present invention.

The character generator comprises a section erasure control circuit 30 which controls the operation of the display data memory 16 shown in FIG. 4. The section erasure control circuit 30 receives address data 244 which includes a section erasure start address and address data 245 which includes a section erasure end address and a section erasure on/off bit data from the data control part 14 and the address control part 15 shown in FIG. 4 and detects a section erasure region using a clock signal which is input from the character size oscillator 11 shown in FIG. 4. Thereafter, the section erasure control circuit 30 controls the operation of display data memory 16 in accordance with the detected section erasure region.

Figure 5:
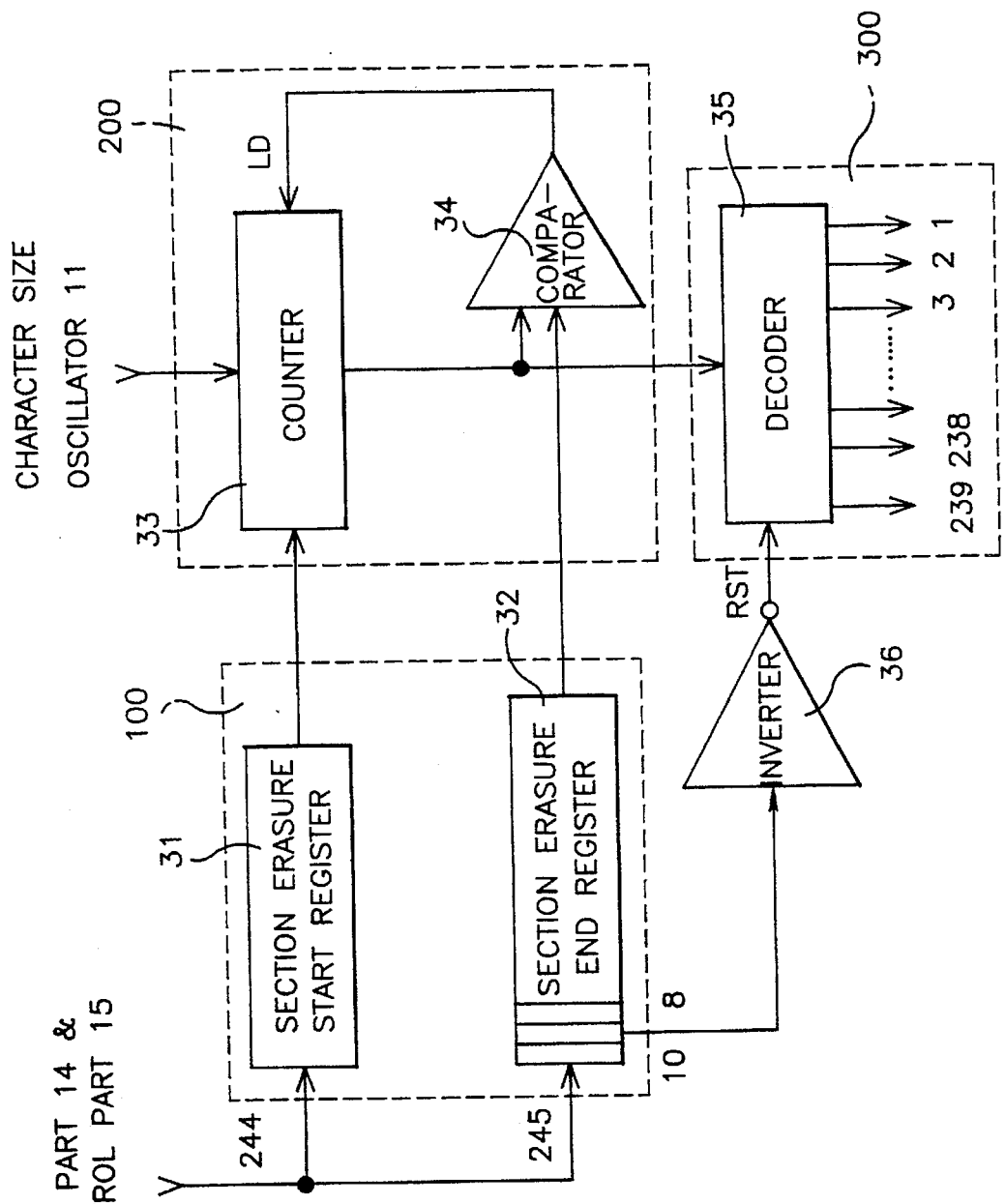
FIG. 5 is a circuit diagram of the section erasure control circuit shown in FIG. 4.

FIG. 5, illustrates a detailed diagram of the section erasure control circuit 30 shown in FIG. 4.

The section erasure circuit 30 includes a part 100 for receiving the section erasure address data;

a part 200 for analyzing the section erasure address data and controlling a section erasure region; and a part 300 for decoding an output from the part 200 and outputting an erasure execution signal in accordance with the decoding result.

In more in detail, the section erasure control circuit 30 comprises a section erasure start register 31 for storing and outputting address data 244 which includes a section erasure start address, input from the data control part 14 and the address control part 15;

a section erasure end register 32 for storing and outputting address data 245 which includes a section erasure end address and a section erasure on/off bit data, input from the data control part 14 and the address control part 15;

a counter 33 for counting the clock signal of character size oscillator 11 and outputting data to execute a section erasure from the section erasure start address when the counted value is consistent with the section erasure start address data output from the section erasure start register 31;

a comparator 34 for comparing the counted valve from the counter 33 with the section erasure end address data from the section erasure end register 32 and outputting a reload signal to the counter 33 if the counted value is consistent with the section erasure end address data;

a decoder 35 for decoding the data from the counter 33 and outputting a reset signal to a line corresponding to a section erasure address in accordance with the decoded result, thereby controlling the operation of the display data memory 16; and an inverter for inverting a section erasure on/off bit signal (herein, 10 bits) from the section erasure end register 32 and controlling the on/off operation of the decoder 35 in accordance with the inverting result.

The section erasure control circuit 30 shown in FIG. 5 operates as follows. As shown in FIG. 6, since a section erasure start address data is previously predetermined in an address 244 and also a section erasure end address and section erasure on/off bit data are previously predetermined in an address 245, the section erasure start address data of the address 24 is stored in the section erasure start register 31 and the section erasure end address data of the address 245 is stored in the section erasure end register 32.

If the section erasure start address data which is stored in the section erasure start register 31 is fed to the counter 33, the counter 33 counts the clock signal CLK and transfers the section erasure start signal to the decoder 35 when the counting value is consistent with the section erasure start address. The decoder 35 decoding the section erasure start signal and controls the operation of display data memory 16 in accordance with the decoding result such that an erasure can be executed from the section erasure start address.

Namely, if the section erasure start address is 35, the decoder 35 outputs a high level signal for the 35th output terminal and outputs a low level signal for all other output terminals except for 35th output terminal, thereby erasing the data of the address 35.

The erasing of the data of the address 36 is carried out in the same manner as that of the data of the address 35. Thereafter, the data of following addresses is also erased in this manner.

During the execution of the above erasure operation, if the counting value from the counter 33 is consistent with the section erasure end address from the section erasure end register 32 and thereby the data of section erasure end address is also erased, the comparator 34 transfers a reload signal to the counter 33 so that a next erasure can be again executed from the section erasure start address.

On the other hand, the section erasure on/off bit data (herein, 10 bits) from the section end register 32 is inverted through the inverter 36 and then fed to the decoder 35 as a reset signal RST, thereby controlling the on/off operation of the decoder 35.

Figure 7:
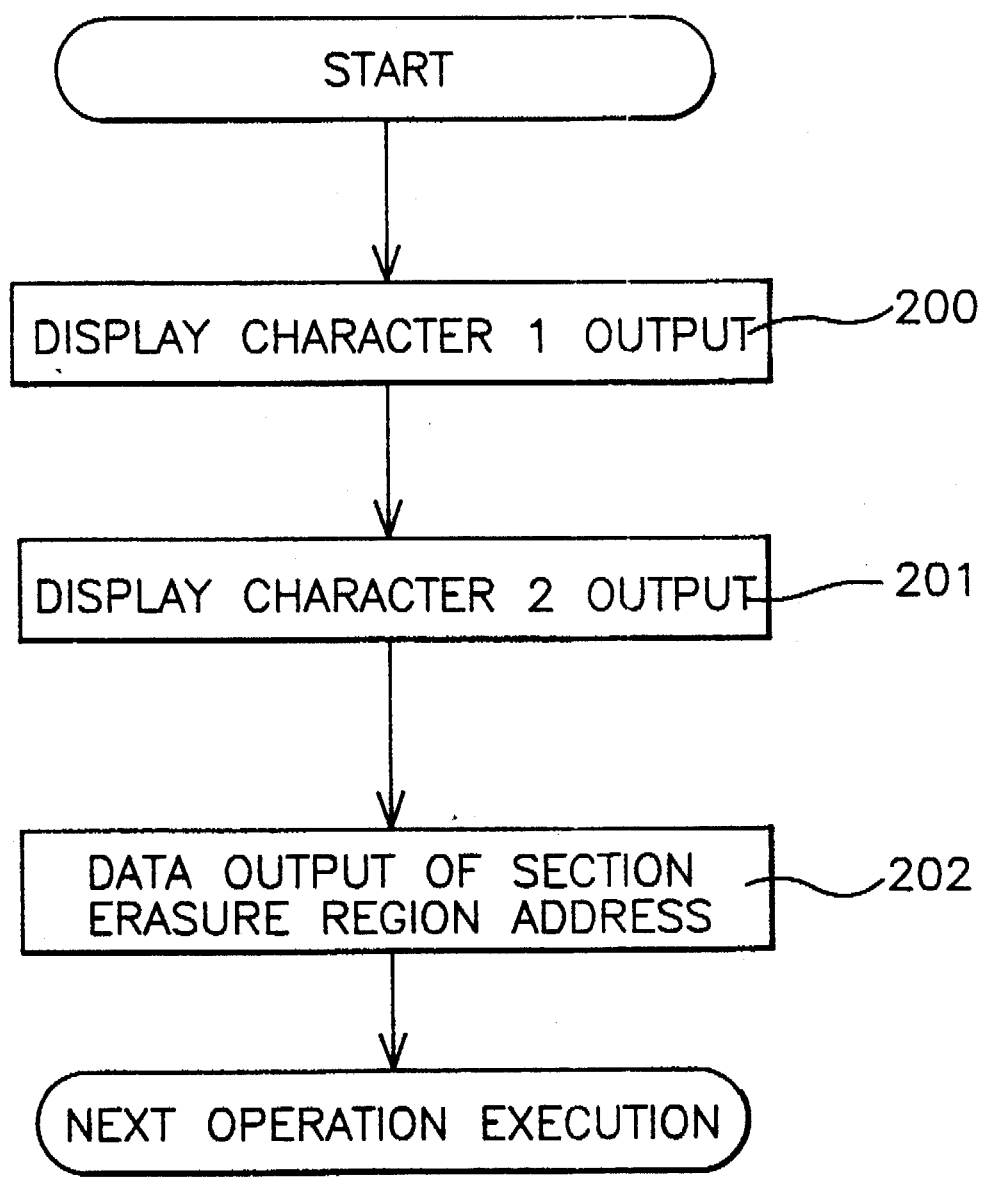
FIG. 7 is a flow chart showing operation of a microcomputer utilized in one embodiment of the character generator of the present invention.

According to the present invention, as shown in FIG. 7, prevented for being a character is displayed at a region except for a predetermined character display region of screen since a microcomputer outputs a display character 1 and a display character 2 in this order (200, 201) and then outputs the data as to section erasure region address (202).

As apparent from the above description, the present invention has an advantage, in that the load of microcomputer can be reduced since a character signal displayed at a region except for a predetermined character display region is erased by utilizing the section erasure start address, the section erasure end address and the section erasure on/off bit data.

What is claimed is:

1. A section erasure control apparatus for a character generator for removing an erroneous character inserted during interfacing of the character generator with a microprocessor, comprising:

section erasure data receiving means for receiving section erasure data, including a section erasure start address, a section erasure end address, and erasure on/off bit data as one data block from a memory of the microcomputer;

section erasure region control means for analyzing said section erasure data and identifying a section erasure region which defines all character areas to be erased; and decoding means for decoding output data from said section erasure region control means and outputting an erasure execution signal identifying the section erasure region in accordance with said decoding;

said character generator erasing all character areas to be erased in accordance with the erasure execution signal.

2. The section erasure control apparatus of claim 1, said apparatus further comprising: an inverter for controlling on/off operations of said decoding means in response to the erasure on/off bit data included in the section erasure data, received by said section erasure data receiving means.

3. The section erasure control apparatus of claim 1, wherein, said section erasure data receiving means includes:

a section erasure start register for receiving, storing, and outputting the section erasure start address of the section erasure data; and a section erasure end register for receiving, storing, and outputting the section erasure end address of the section erasure data.

4. The section erasure control apparatus of claim 1, wherein said section erasure region control means includes:

a counter for counting the section erasure start address of the section erasure data and outputting data to execute a section erasure from the section erasure start address to said decoding means when a counter value is consistent with the section erasure start address; and a comparator for outputting a reload signal to said counter when the counted value from said counter is consistent with the section erasure end address of the section erasure data.

5. A section erasure control apparatus for removing an erroneous character inserted during interfacing of a character generator with a microprocessor, comprising:

section erasure address receiving means for receiving a section erasure start address, a section erasure end address, and erasure on/off data as one data block from a memory of the microprocessor; and section erasure means for erasing a section, defined by the section erasure start address and the section erasure end address, according to the erasure on/off data, which includes all character areas to be erased.

6. The section erasure control apparatus of claim 5, said section erasure address receiving means including a section erasure start register for storing the section erasure start address and a section erasure end register for storing the section erasure end address.

7. The section erasure control apparatus of claim 5, said section erasure means including, counting means for receiving a clock signal and the section erasure start address and outputting an erasure signal when a counted value equals the section erasure start address, and comparing means for receiving and comparing the erasure signal to the section erasure and address and when the erasure signal and the section erasure end address match, outputting a reload signal to said counting means;

said counting means further outputting the erasure signal to means for decoding.

8. A section erasure control apparatus for a character generator for displaying characters on a screen, said erasure control apparatus removing an erroneous character inserted during interfacing of the character generator with a microprocessor, said section erasure control apparatus comprising:

a section erasure register for receiving, storing, and outputting section erasure data, which defines all character areas to be erased, as one data block from a memory of the microprocessor;

a counter for counting, using a signal output from a character magnitude oscillator as a clock signal;

a comparator for comparing an output signal of said counter with the section erasure data output from said section erasure register;

a decoder for decoding the output signal of said counter and outputting an erasure execution signal;

said character generator erasing all character areas to be erased in accordance with the erasure execution signal; and an inverter for inverting the section erasure data output from said section erasure register and outputting the inverted section erasure data as a reset control signal for resetting said decoder.

9. The section erasure control apparatus of claim 8, wherein said comparator compares the output signal of said counter with section erasure end data included in the section erasure data output from said section erasure register and outputs a load signal to said counter when the output signal of said counter and the section erasure end data are consistent, to identify a signal output from said counter as a start address.

10. A character display apparatus, comprising:

a microprocessor, including a memory for storing character information and section data, wherein the section erasure data defines an erasure region including all character areas to be erased, the section erasure data including a section erasure start address, a section erasure end address, and/or erasure on/off bit data;

a character generator, receiving the character information and the section erasure data from said microprocessor as one data block, displaying characters in accordance with the character information, and executing an erasure operation for the entire erasure region.

11. The character display apparatus of claim 10, wherein the erasure region including character areas to be erased, reduces an input/output burden on said microprocessor.

12. A method of character display and erasure, comprising the steps of:

a) storing character information and section erasure data in a memory of a microprocessor, wherein the section erasure data defines an erasure region including all character areas to be erased, the section erasure including a section erasure start address, a section erasure end address, and/or erasure on/off bit data;

b) transmitting the character information and the section erasure data as one data block from the memory of the microprocessor to a character generator;

c) displaying characters in accordance with the character information; and d) executing an erase operation for all character areas defined by the section erasure data.

13. The method of claim 12, wherein the erasure region including character areas to be erased, reduces an input/output burden on the microprocessor.

* * * * *